US009803493B2

(12) United States Patent
Svihla et al.

(10) Patent No.: US 9,803,493 B2
(45) Date of Patent: Oct. 31, 2017

(54) TURBINE BEARING AND SEAL ASSEMBLY FOR A TURBOCHARGER

(71) Applicant: Electro-Motive Diesel, Inc., LaGrange, IL (US)

(72) Inventors: Gary R. Svihla, Burr Ridge, IL (US); Raji Rexavier, Plainfield, IL (US); Joshua D. Schueler, New Lenox, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 314 days.

(21) Appl. No.: 14/503,875

(22) Filed: Oct. 1, 2014

(65) Prior Publication Data
US 2016/0097302 A1    Apr. 7, 2016

(51) Int. Cl.
*F01D 11/02*   (2006.01)
*F01D 25/16*   (2006.01)
*F02C 6/12*    (2006.01)
*F04D 29/16*   (2006.01)
*F04D 29/10*   (2006.01)
*F04D 29/056*  (2006.01)
*F01D 25/18*   (2006.01)

(52) U.S. Cl.
CPC ............ *F01D 11/02* (2013.01); *F01D 25/166* (2013.01); *F02C 6/12* (2013.01); *F04D 29/0563* (2013.01); *F04D 29/10* (2013.01); *F04D 29/164* (2013.01); *F01D 25/186* (2013.01); *F05D 2220/40* (2013.01)

(58) Field of Classification Search
CPC ...... F04D 29/05; F04D 29/0563; F04D 29/10; F04D 29/102; F04D 29/164; F01D 11/003; F01D 11/02; F01D 25/166; F01D 25/186; F02C 6/12; F05D 2220/40
USPC ............ 417/407; 60/597–624; 277/412, 418, 277/419
See application file for complete search history.

(56) References Cited

U.S. PATENT DOCUMENTS 2,254,862 A    9/1941 Watson et al.
3,531,131 A    9/1970 Hummer
(Continued)

FOREIGN PATENT DOCUMENTS

CN    203548697 U    4/2014
EP    2 615 261 A1    7/2013
WO    WO 2013/022684    2/2013

OTHER PUBLICATIONS

U.S. Patent Application of Gary R. Svihla et al. entitled "Compressor Seal Assembly for a Turbocharger" filed on Oct. 1, 2014.

*Primary Examiner* — Theodore Stigell
*Assistant Examiner* — Chirag Jariwala
(74) *Attorney, Agent, or Firm* — Finnegan, Henderson, Farabow, Garrett & Dunner LLP

(57) ABSTRACT

A turbine bearing and seal assembly is disclosed. The turbine bearing and seal assembly may have a turbine cartridge. The turbine cartridge may have a compressor end and a turbine end opposite the compressor end. The turbine bearing and seal assembly may also have a bearing attached to the turbine cartridge. The bearing may be disposed between the compressor end and the turbine end. The turbine bearing and seal assembly may further have a seal collar attachable to a shaft. The seal collar may be disposed within the turbine cartridge adjacent the turbine end.

14 Claims, 4 Drawing Sheets

(56) References Cited

U.S. PATENT DOCUMENTS

| | | | |
|---|---|---|---|
| 3,988,081 A | 10/1976 | Goloff et al. | |
| 4,840,384 A | 6/1989 | Dorsch | |
| 6,368,077 B1* | 4/2002 | Meyerkord | F01D 11/02 277/320 |
| 6,758,598 B2 | 7/2004 | Beauvais et al. | |
| 7,374,402 B2* | 5/2008 | Thiele | F01D 5/025 416/204 A |
| 7,445,213 B1* | 11/2008 | Pelfrey | F01D 11/02 277/418 |
| 8,147,181 B2* | 4/2012 | Gee | F01D 25/183 415/111 |
| 9,371,835 B2* | 6/2016 | Stanko | F01D 21/045 |
| 2008/0260521 A1* | 10/2008 | Werro | F01D 11/003 415/170.1 |
| 2009/0136368 A1 | 5/2009 | Arnold et al. | |
| 2013/0071243 A1 | 3/2013 | Kocher et al. | |
| 2013/0089407 A1 | 4/2013 | Ranz | |
| 2013/0177407 A1 | 7/2013 | Heaton et al. | |
| 2014/0003912 A1 | 1/2014 | Knaack | |
| 2014/0086731 A1 | 3/2014 | Schmidt et al. | |
| 2014/0193239 A1* | 7/2014 | Ramasamy | F01D 25/186 415/111 |
| 2015/0233299 A1* | 8/2015 | Chekansky | F02C 7/28 60/605.1 |

\* cited by examiner

TURBINE BEARING AND SEAL ASSEMBLY FOR A TURBOCHARGER

TECHNICAL FIELD

The present disclosure relates generally to a turbine bearing and seal assembly and, more particularly, to a turbine bearing and seal assembly for a turbocharger.

BACKGROUND

Internal combustion engines, for example, diesel engines, gasoline engines, or natural gas engines employ turbochargers to deliver compressed air for combustion in the engine. A turbocharger compresses air flowing into the engine, helping to force more air into the combustion chambers of the engine. The increased supply of air allows increased fuel combustion in the combustion chambers of the engine, resulting in increased power output from the engine.

A typical turbocharger includes a housing, a shaft, a turbine wheel attached to one end of the shaft, a compressor impeller connected to the other end of the shaft, and bearings to support the shaft. Exhaust from the engine expands over the turbine wheel and rotates the turbine wheel. The turbine wheel in turn rotates the compressor impeller via the shaft. The compressor impeller receives cool air from the ambient and forces compressed air into combustion chambers of the engine.

Bearings help to center the turbine wheel, the compressor impeller, and the shaft about an axis of rotation. An oil pump typically provides pressurized oil to lubricate the bearings. One or more seals help to prevent leakage of oil from a bearing housing surrounding the bearings into the turbine housing. The seals also help to prevent leakage of hot exhaust from the turbine housing into the bearing housing. Turbocharger seals often include a piston ring type arrangement in which a baffle extends radially inward from a bearing housing bore into an annular recess in an outer surface of the shaft. Imbalance in the turbine wheel or shaft can cause the baffle to dig into the shaft, causing damage to both the shaft and the bearing housing. Although the bearing housing and/or shaft can be repaired or replaced, such repairs can be expensive and may place the turbocharger out of service.

One attempt to address some of the problems described above is disclosed in U.S. Patent Application Publication No. 2013/0071243 A1 of Kocher et al. that published on Mar. 23, 2013 ("the '243 publication"). In particular, the '243 publication discloses a turbocharger rotating assembly that includes a shaft supported by a bearing. The '243 publication further discloses that the bearing is disposed in a sleeve inserted into the turbocharger housing. The '243 publication discloses that the sleeve has a lubricant passage for supplying lubricant to the bearing. The '243 publication also discloses a piston-ring seal arrangement in which the outer surface of the shaft has an annular groove that receives a seal component which has an outer surface located in close proximity to an inner wall of the sleeve.

Although the '243 publication discloses a sleeve member that supports the turbine bearing and provides an oil seal, the disclosed arrangement may still be less than optimal. For example, maintaining close proximity between the outer surface of the seal component and the inner wall of the sleeve may require tight control over dimensions, which may increase the manufacturing cost. Moreover, machining two separate bores in the sleeve to accommodate the bearing and provide the sealing feature may require changing fixtures during manufacturing, making it difficult to tightly control the concentricity of the sealing surface and the bearing. In addition, because the sleeve of the '243 publication is directly attached to the turbine housing, the sleeve may be exposed to very high temperatures due to the heat transferred from hot exhaust gases via the turbine housing to the sleeve. Exposure to high temperatures may degrade the performance of the bearing and may reduce the useful life of the bearing and the sleeve. The piston-ring seal arrangement of the '243 publication may also be insufficient to prevent oil leakage from the bearing into the turbine housing.

The turbine bearing and seal assembly of the present disclosure solves one or more of the problems set forth above and/or other problems of the prior art.

SUMMARY

In one aspect, the present disclosure is directed to a turbine bearing and seal assembly. The turbine bearing and seal assembly may include a turbine cartridge. The turbine cartridge may have a compressor end and a turbine end opposite the compressor end. The turbine bearing and seal assembly may also include a bearing attached to the turbine cartridge. The bearing may be disposed between the compressor end and the turbine end. The turbine bearing and seal assembly may further include a seal collar attachable to a shaft. The seal collar may be disposed within the turbine cartridge adjacent the turbine end.

In another aspect, the present disclosure is directed to a turbine cartridge. The turbine cartridge may include a compressor end and a turbine end opposite the compressor end. The turbine cartridge may also include a first cartridge bore extending from the compressor end to a first distal end within the turbine cartridge. The first cartridge bore may have a substantially conical inner surface. The turbine cartridge may include a second cartridge bore extending from the turbine end to a second distal end within the turbine cartridge. The second cartridge bore may have a substantially conical shape. The turbine cartridge may further include a third cartridge bore disposed between the first cartridge bore and the second. The third cartridge bore may have a substantially cylindrical shape.

DETAILED DESCRIPTION

Figure 1:
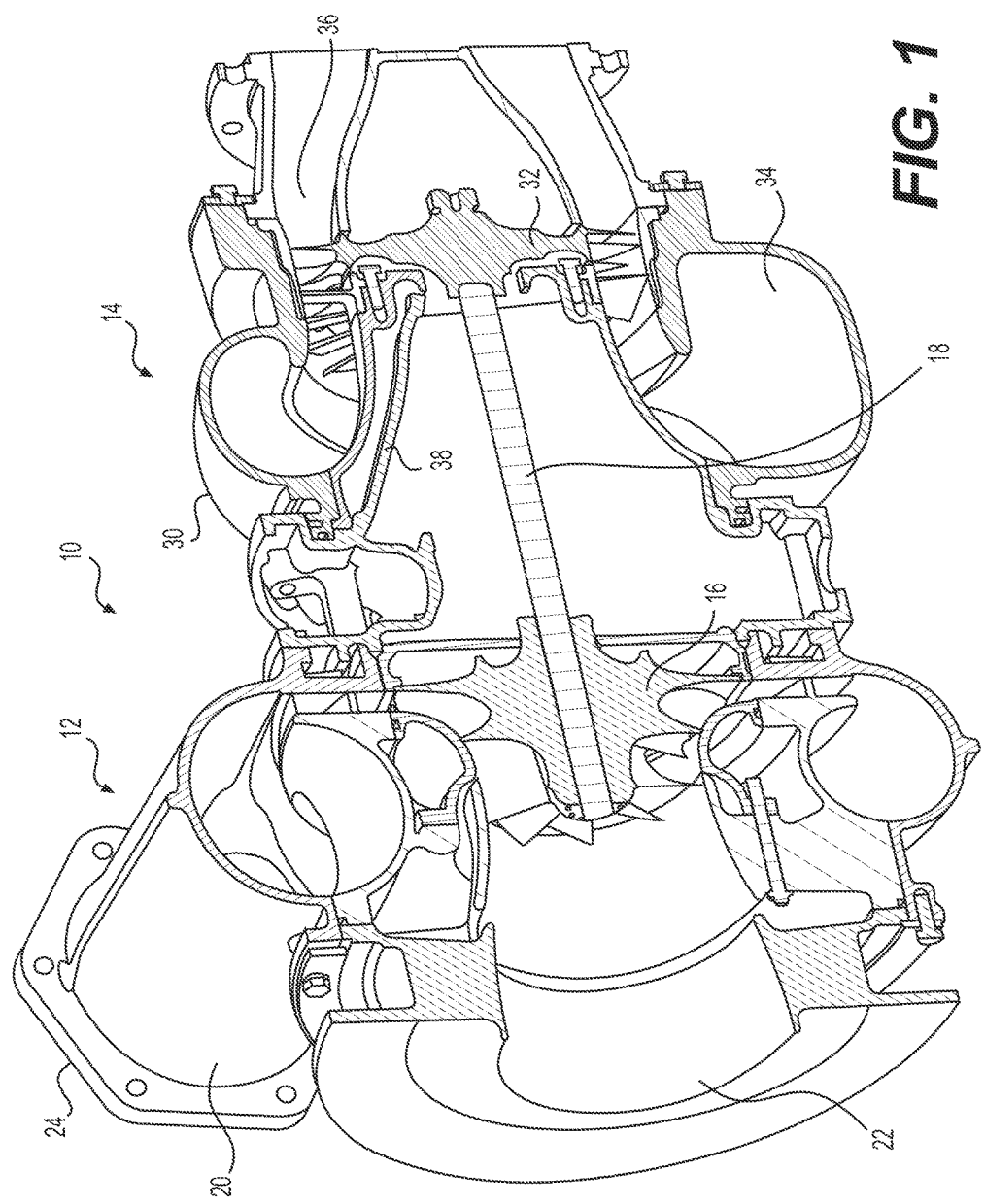
FIG. 1 is a cut-away view of an exemplary disclosed turbocharger.

FIG. 1 illustrates an exemplary embodiment of a turbocharger 10. Turbocharger 10 may be used with an engine (not shown) of a machine that performs some type of operation associated with an industry such as railroad, marine, power generation, mining, construction, farming, or another industry known in the art. As shown in FIG. 1, turbocharger 10 may include compressor stage 12 and turbine stage 14. Compressor stage 12 may embody a fixed geometry compressor impeller 16 attached to shaft 18 and configured to compress air received from an ambient to a predetermined pressure level before the air enters the engine for combustion. Air may enter compressor housing 20 via compressor inlet 22 and exit compressor housing 20 via compressor outlet 24. As air moves through compressor stage 12, compressor impeller 16 may increase the pressure of the air which may be directed into the engine.

Turbine stage 14 may include turbine housing 30 and turbine wheel 32, which may be attached to shaft 18, extending from compressor housing 20 to turbine housing 30. Exhaust gases exiting the engine may enter turbine housing 30 via turbine inlet 34 and exit turbine housing 30 via turbine outlet 36. As the hot exhaust gases move through turbine housing 30 and expand against the blades of turbine wheel 32, turbine wheel 32 may rotate compressor impeller 16 via shaft 18. The hot exhaust gases may also heat turbine housing 30, which in turn may heat compressor housing 20, bearing housing 38, and other components of the turbocharger attached to or located near turbine housing 30.

Figure 2:
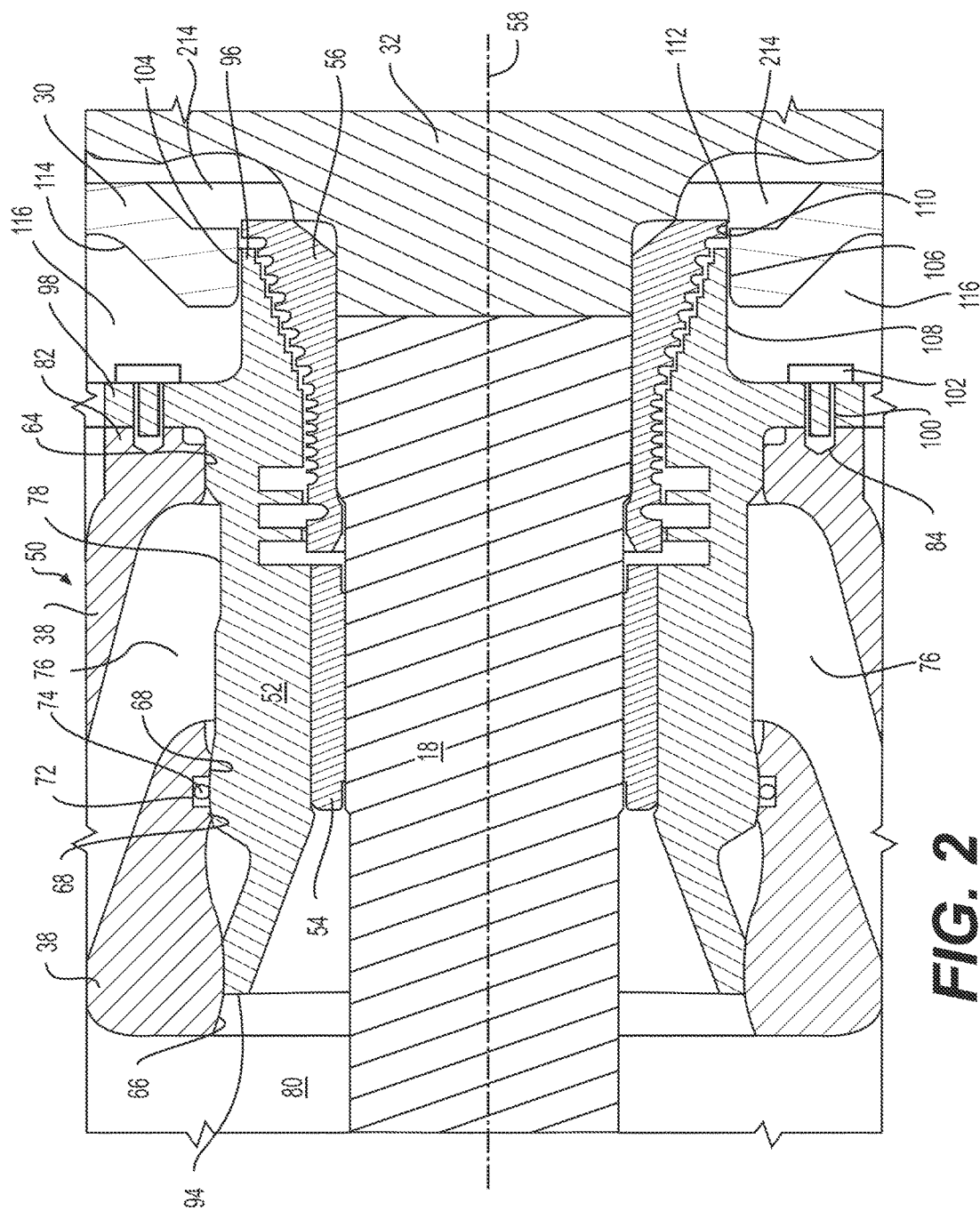
FIG. 2 is a cut-away view of an exemplary disclosed turbine bearing and seal assembly for the turbocharger of FIG. 1.

FIG. 2 illustrates a cut-away view of an exemplary embodiment of a turbine bearing and seal assembly 50 for turbocharger 10. Turbine bearing and seal assembly 50 may include shaft 18, turbine housing 30, turbine wheel 32, bearing housing 38, turbine cartridge 52, bearing 54, and seal collar 56, all of which may be disposed around a rotational axis 58 of shaft 18. As illustrated in FIG. 2, bearing housing 38 may include a first housing bore 64, a second housing bore 66, and a third housing bore 68 disposed between first and second housing bores 64, 66. Turbine cartridge 52 may be received in first, second, and third housing bores 64, 66, 68 of bearing housing 38. In one exemplary embodiment, turbine cartridge 52 may be aligned to bearing housing 38 via interference fits at first and second housing bores 64, 66 and via a clearance fit at third housing bore 68. Third housing bore 68 may include an annular groove 72. Seal member 74 may be seated in annular groove 72 to prevent oil from leaking from channel 76 in bearing housing 38 and flowing towards second housing bore 66. In one exemplary embodiment, seal member 74 may be an O-ring. As illustrated in FIG. 2, bearing housing 38 may completely surround turbine cartridge 52. During operation of turbocharger 10, oil may flow through channel 76 around first outer surface 78 of turbine cartridge 52 to help cool turbine cartridge 52. Oil flowing through channel 76 around first outer surface 78 of turbine cartridge 52 may drain into cavity 80 in bearing housing 38.

Bearing housing 38 may include a bearing housing flange 82 disposed adjacent first housing bore 64. Bearing housing flange 82 may have a plurality of tapped holes 84, which may be circumferentially disposed on bearing housing flange 82. In one exemplary embodiment, holes 84 may be spaced apart circumferentially equidistant from each other.

Turbine cartridge 52 may have a compressor end 94 and a turbine end 96 disposed opposite the compressor end 94. Turbine cartridge 52 may also include a mounting flange 98 disposed between compressor end 94 and turbine end 96. In one exemplary embodiment as illustrated in FIG. 2, mounting flange 98 may be disposed nearer to turbine end 96 as compared to compressor end 94. It is contemplated, however, that mounting flange 98 may be disposed anywhere between compressor end 94 and turbine end 96. A plurality of holes 100 may be circumferentially disposed on mounting flange 98. In one exemplary embodiment, holes 100 may be spaced apart circumferentially equidistant from each other. In another exemplary embodiment, holes 100 may be threaded. One or more fasteners 102 may pass through holes 100 and engage with threads in holes 84 to attach mounting flange 98 to bearing housing 38.

Bearing 54 may be disposed within turbine cartridge 52 between compressor end 94 and turbine end 96. In one exemplary embodiment as illustrated in FIG. 2, bearing 54 may be located nearer compressor end 94 as compared to turbine end 96. It is contemplated, however, that bearing 54 may be located anywhere within turbine cartridge 52. In one exemplary embodiment, bearing 54 may be a floating bearing aligned with turbine cartridge 52 both axially and rotationally with a radial pin (not shown). In another exemplary embodiment, bearing 54 may be attached to turbine cartridge 52 via an interference fit. Bearing 54 may help support shaft 18 and may be configured to react to radial loads on shaft 18. Although FIG. 2 illustrates one bearing 54, it is contemplated that any number of bearings 54 may be disposed within turbine cartridge 52 to support shaft 18. Bearing 54 may be a journal bearing, a roller bearing, or any other type of bearing known in the art.

Turbine wheel 32 may be attached to shaft 18 adjacent turbine end 96 of turbine cartridge 52. Seal collar 56 may be disposed on shaft 18 adjacent turbine end 96. In one exemplary embodiment, seal collar 56 may be attached to shaft 18 via an interference fit. As illustrated in FIG. 2, turbine cartridge 52 and seal collar 56 may be received in turbine housing bore 104 of turbine housing 30 adjacent to turbine end 96. As further illustrated in FIG. 2, inner wall 106 of turbine housing bore 104 may be separated from second outer surface 108 of turbine cartridge 52 and outer surface 110 of seal collar 56, respectively, by an annular gap 112. Turbine housing wall 114 may also be separated from mounting flange 98, second outer surface 108 of turbine cartridge 52, and outer surface 110 of seal collar 56 by a substantially annular cavity 116. Annular gap 112 may help prevent transfer of gas and associated thermal energy from turbine housing 30 to turbine cartridge 52. Similarly, annular cavity 116 may prevent transfer of heat from turbine housing 30 to turbine cartridge 52 and/or seal collar 56.

Figure 3:
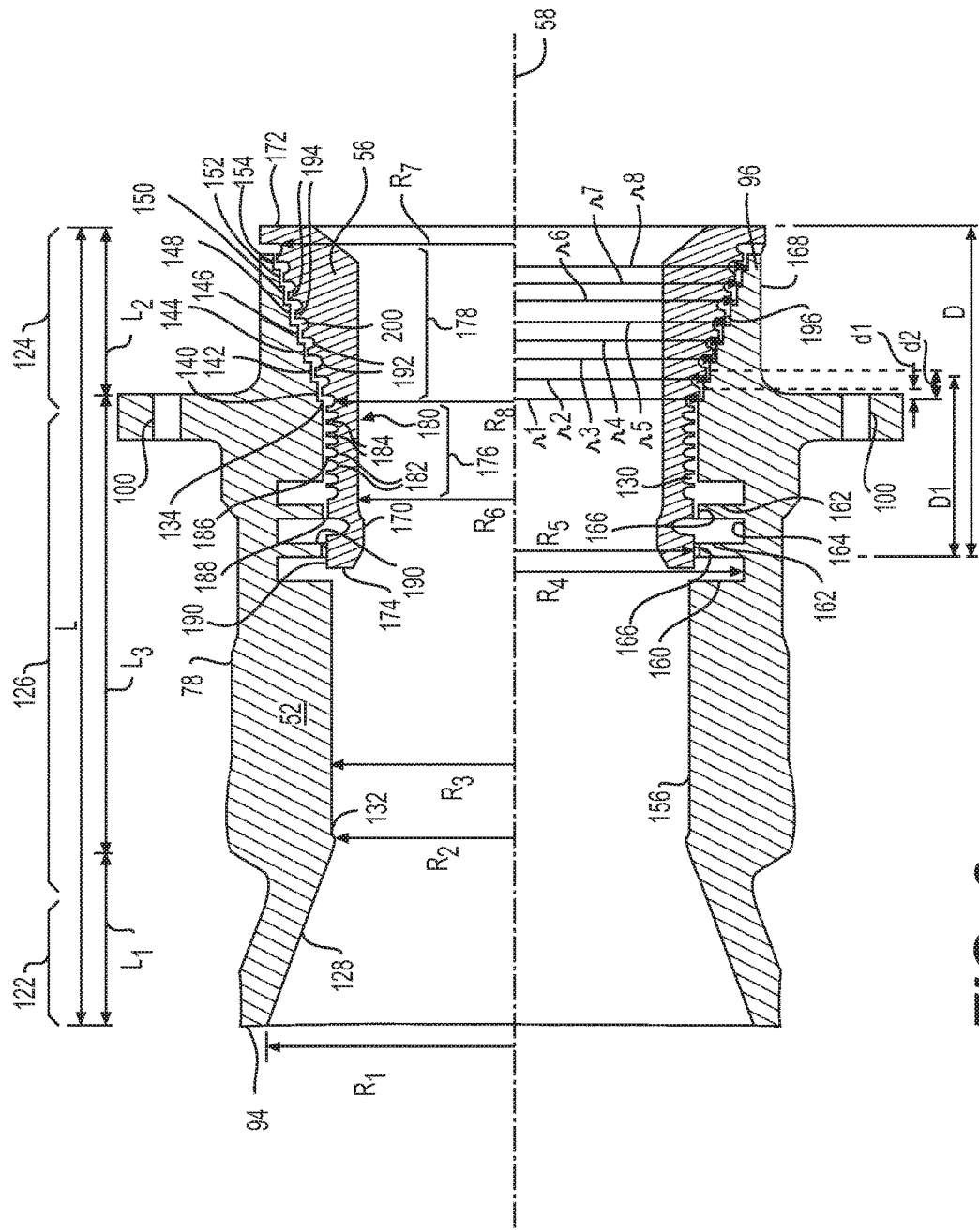
FIG. 3 is a cut-away view of an exemplary disclosed turbine cartridge and seal collar of the turbine bearing and seal assembly of FIG. 2.

FIG. 3 illustrates a cut-away view of an exemplary embodiment of turbine cartridge 52 and seal collar 56. Turbine cartridge 52 may include a first cartridge bore 122 disposed adjacent compressor end 94 and second cartridge bore 124 disposed adjacent turbine end 96. Turbine cartridge 52 may also include third cartridge bore 126 disposed between first cartridge bore 122 and second cartridge bore 124. First cartridge bore 122 may have a generally conical inner surface 128, extending inwards from compressor end 94 towards turbine end 96. For example, inner surface 128 of first cartridge bore 122 may extend from compressor end 94 to first distal end 132 within turbine cartridge 52. As illustrated in FIG. 3, an axial distance L1 between compressor end 94 and first distal end 132 may be smaller than a length L of turbine cartridge 52. First cartridge bore 122 may have a first radius R1 adjacent compressor end 94 and a second radius R2 adjacent first distal end 132. In one exemplary embodiment as illustrated in FIG. 3, radius R1 may be larger than radius R2. Although inner surface 128 has been described as having a conical shape, it is contemplated that inner surface 128 of first cartridge bore 122 may have a substantially cylindrical shape.

Second cartridge bore 124 may have a generally conical shape, extending inwards from turbine end 96 towards compressor end 94. For example, second cartridge bore 124 may extend from turbine end 96 to second distal end 134 within turbine cartridge 52. As illustrated in FIG. 3, an axial distance "L2" between turbine end 96 and second distal end 134 may be smaller than a length L of turbine cartridge 52.

Second cartridge bore 124 may include a plurality of generally cylindrical annular bores having different radii. For example, second cartridge bore 124 may include first, second, third, fourth, fifth, sixth, seventh, and eight annular bores 140, 142, 144, 146, 148, 150, 152, 154. First annular bore 140 may be disposed adjacent second distal end 134. Eighth annular bore 154 may be disposed adjacent turbine end 96. Second through seventh annular bores 142, 144, 146, 148, 150, 152 may be disposed between first annular bore 140 and eighth annular bore 154 at successively larger axial distances from second distal end 134. For example, first annular bore 140 may be disposed at a first axial distance "d1" from second distal end 134 and second annular bore 142 may be disposed at a second axial distance "d2" from second distal end 134. As illustrated in the exemplary embodiment of FIG. 3, distance d2 may be larger than distance d1. First, second, third, fourth, fifth, sixth, seventh, and eight annular bores 140, 142, 144, 146, 148, 150, 152, 154 may have inner radii "r1," "r2," "r3," "r4," "r5," "r6," "r7," "r8," respectively. In one exemplary embodiment as illustrated in FIG. 3, r1<r2<r3<r4<r5<r6<r7<r8. For example, first annular bore 140 may have a first inner radius r1 and second annular bore 142 may have a second inner radius r2 which may be larger than radius r1. Thus, for example, second cartridge bore 124 may have a radius r8 at turbine end 96 and another radius r1 at second distal end 134, the radius at the distal end being smaller than the radius at the turbine end. It is contemplated, however, that one or more of adjacently located annular bores 140, 142, 144, 146, 148, 150, 152, 154 may have substantially the same inner radii. For example, in one exemplary embodiment, third and fourth annular bore 144, 146 may have the same inner radius (i.e. r3=r4), which may be different from the inner radii of first, second, fifth, sixth, seventh, and eighth annular bores 140, 142, 148, 150, 152, 154. Although FIG. 3 illustrates eight annular bores 140, 142, 144, 146, 148, 150, 152, 154, it is contemplated that second cartridge bore 124 may include any number of annular bores.

Third cartridge bore 126 may extend from first distal end 132 to second distal end 134. A length "L3" of third cartridge bore 126 may be smaller than length L of turbine cartridge 52. Third cartridge bore 126 may have an inner surface 156, which may have a radius "R3," which may be equal to or smaller than radius R2. Inner surface 156 of third cartridge bore 126 may have a substantially cylindrical shape. In one exemplary embodiment, inner radius R3 may vary continuously or discontinuously from first distal end 132 to second distal end 134. Portions of first cartridge bore 122 and third cartridge bore 126 may be configured to receive bearing 54, which may be disposed within first and third cartridge bores 122, 126 via an interference fit or a clearance fit with inner surface 156. Inner surface 156 of third cartridge bore 126 may also include an annular recess 160 having a radius "R4." In one exemplary embodiment as illustrated in FIG. 3, radius R4 may be larger than radius R3 of inner surface 156. Annular recess 160 may include a plurality of baffles 162, which may extend radially inwards from inner wall 164 of annular recess 160. Tips 166 of baffles 162 may have a radius "R5," which may be equal to or different from radius R3 of inner surface 156.

Seal collar 56 may be disposed within turbine cartridge 52 adjacent to turbine end 96. Seal collar 56 may include a seal collar bore 170 that may have a radius "R6," which may be the same as or different from radius R3 of inner surface 130. Seal collar bore 170 may have a substantially cylindrical shape. Seal collar 56 may receive shaft 18 (see FIG. 2) within seal collar bore 170. In one exemplary embodiment, seal collar 56 may be attached to shaft 18 via an interference fit between shaft 18 and seal collar bore 170.

Seal collar 56 may have a front end 172 and a rear end 174 opposite front end 172. Seal collar may include a labyrinth seal 176 and a step seal 178. Labyrinth seal 176 may extend from rear end 174 towards front end 172 for an axial distance D1 which may be smaller than a length D of seal collar 56. For example, labyrinth seal 176 may extend from rear end 174 to third distal end 180 within seal collar 56. In one exemplary embodiment, third distal end 180 may be axially co-located with second distal end 134 of second cartridge bore 124. As illustrated in FIG. 3, labyrinth seal 176 may include an outer surface 182, which may have a substantially cylindrical shape. A plurality of projections 184 may project radially outward from outer surface 182. An annular gap 186 between projections 184 and inner surface 156 and an annular gap 188 between tips 166 of baffles 162 and an outer surface 190 of seal collar 56 may allow seal collar 56 to rotate with shaft 18 within turbine cartridge 52.

Step seal 178 may extend from front end 172 of seal collar 56 to third distal end 180. Step seal 178 may also include an outer surface 192. In one exemplary embodiment as illustrated in FIG. 3, outer surface 192 may have a substantially conical shape extending inward from front end 172 to third distal end 180. For example, outer surface 192 may have a radius "R7" adjacent front end 172 and a radius "R8" adjacent third distal end 180. In one exemplary embodiment, radius R7 may be larger than radius R8. Step seal 178 may include a plurality of projections 194, which may extend radially outward from outer surface 192. Annular gaps 196 between projections 194 and inner surfaces of annular bores 140, 142, 144, 146, 148, 150, 152, 154 may allow seal collar 56 to rotate within turbine cartridge 52. Projections 194 may cooperate with annular bores 140, 142, 144, 146, 148, 150, 152, 154 to form a plurality of step seal cavities 200, each of which may constitute a toroidal volume about rotational axis 58.

Figure 4:
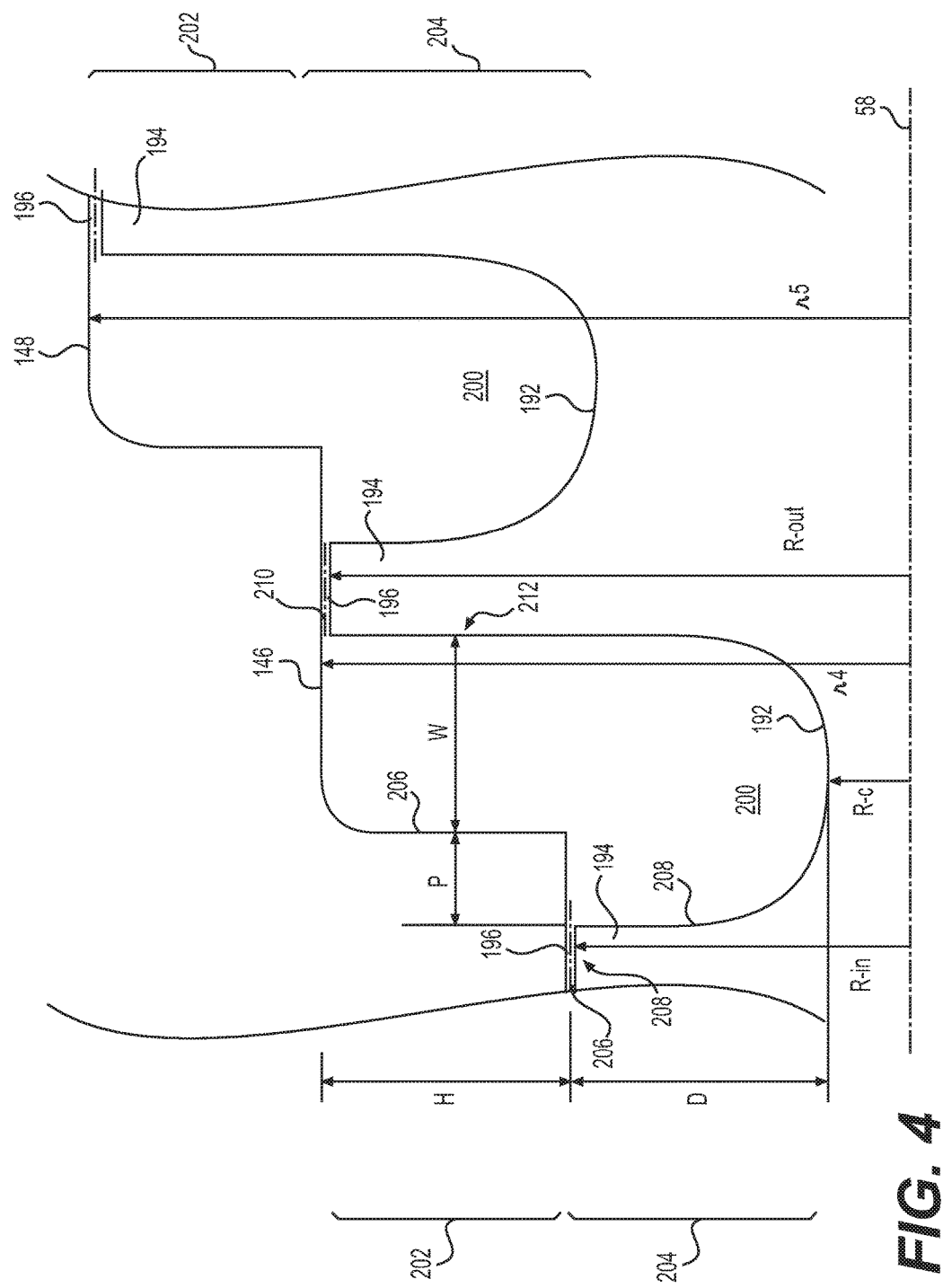
FIG. 4 is a diagrammatic view of an exemplary disclosed step seal of the seal collar of FIG. 3.

FIG. 4 illustrates a diagrammatic view showing two adjacent step seal cavities 200 formed by fourth and fifth annular bores 146, 148 and projections 194. As illustrated in FIG. 4, each cavity 200 has an upper cavity 202 and a lower cavity 204 offset from the upper cavity by a distance "P." Each cavity may have width "W" and a depth "D." As also illustrated in FIG. 4, each cavity may have an inlet 206 at first cavity end 208 and an outlet 210 at second cavity end 212 disposed opposite first cavity end 208. Inlet 206 and outlet 210 may correspond to annular gaps 196. Inlet 206 may be located at an inlet radius "R-in" relative to rotational axis 58. Outlet 210 may be located at an outlet radius "R-out" relative to rotational axis 58. A difference between radii R-out and R-in may be represented by a distance "H." In one exemplary embodiment, H may be equal to the difference between inner radius r5 of fifth annular bore 150 and inner radius r4 of fourth annular bore 148. Distance "D" may represent a radial distance between radius R-in of inlet 206 and a radius "R-c" of a base of cavity 200. Radius R-c may correspond to a radius of a location on outer surface 192, which is nearest to rotational axis 58. In one exemplary embodiment, to minimize flow of exhaust gas through annular gap 196 and cavities 200, a ratio of W to H may range from about 0.8 to about 1.5, a ratio of P to H may range from about 0.2 to about 1.4, and a ratio of D to H may range from about 0.5 to about 1.5.

Returning to FIG. 2, seal collar 56 may cooperate with turbine cartridge 52 to form a charged turbine bearing and seal assembly 50. Labyrinth seal 176 and step seal 178 (see FIG. 3) may provide air sealing, which may prevent oil from leaking from bearing 54 to turbine housing 30 and prevent exhaust gases from turbine housing 30 from reaching bearing 54. Baffles 162 and annular gap 188 (see FIG. 3) may help minimize flow of oil from bearing 54 to turbine housing 30. For example, compressed air received from compressor housing 20 may pressurize annular cavity 116. Compressed air from compressor housing 20 may also pressurize labyrinth seal 176 and step seal 178 (see FIG. 3). Exhaust gases received from turbine housing 30 may pressurize annular cavity 214 between turbine housing 30 and turbine wheel 32. Pressure of the compressed air in annular cavity 116 may counteract the pressure of the exhaust gases in annular cavity 214 preventing exhaust gases from turbine housing 30 from entering bearing housing 38 and reaching bearing 54. Further, by pressurizing labyrinth seal 176 and step seal 178 (see FIG. 3) with compressed air, turbine bearing and seal assembly 50 may also help minimize a flow of oil from bearing 54 to turbine housing 30 via annular gap 188 (see FIG. 3). The combination of labyrinth seal 176 and step seal 178 may be more effective at preventing leakage of exhaust into bearing housing 38 and leakage of oil into turbine housing 30 compared to using labyrinth seal 176 alone or step seal 178 (see FIG. 3) alone in the geometrical space available in practical turbocharger applications.

INDUSTRIAL APPLICABILITY

The disclosed turbine bearing and seal assembly 50 may be implemented to minimize or eliminate oil leakage from a bearing housing of a turbocharger associated with an internal combustion engine. The disclosed turbine bearing and seal assembly 50 may also be implemented to minimize leakage of exhaust gases into the engine crankcase, which may in turn help minimize the soot content in the crankcase ventilation flow. For example, the disclosed turbine bearing and seal assembly 50 may help reduce an amount of oil leakage from bearing housing 38 to turbine housing 30 using baffles 162. The disclosed turbine bearing and seal assembly 50 may also help reduce an amount of air leakage by providing a highly restrictive path to the air by using labyrinth seal 176, and step seal 178 within turbine bearing and seal assembly 50. The disclosed turbine bearing and seal assembly 50 may allow compressed air from compressor housing 20 to flow through and around labyrinth seal 176 and step seal 178, which may reduce the temperature of seal collar 56. Reducing the temperature of seal collar 56 may help to reduce the allowance required to compensate for thermal growth, which may further help reduce leakage of compressed air from compressor housing 20 into bearing housing 38 via annular gap 196. The disclosed turbine bearing and seal assembly 50 may also allow oil to flow around turbine cartridge 52, helping to cool turbine cartridge 52 and bearing 54 of bearing and seal assembly 50. Further, the disclosed turbine bearing and seal assembly 50 may allow fabrication of turbine cartridge 52, seal collar 56 and first, second, and third housing bores 64, 66, 68 in bearing housing 38 using the same fixture, helping to maintain concentricity of these components. In addition, by separating turbine housing wall 114 from mounting flange 98 via annular cavity 116, the disclosed turbine bearing and seal assembly 50 may help minimize the transfer of heat from turbine housing 30 to turbine cartridge 52 and bearing 54.

Referring to FIGS. 1, 2, and 3, during engine operation, turbine wheel 32 and seal collar 56 may rotate with shaft 18 within turbine cartridge 52. Further, bearing 54 disposed within turbine cartridge 52 may support radial loads on shaft 18. An oil pump may circulate pressurized oil to lubricate bearing 54. Some of the oil may enter channel 76 in bearing housing 38 and flow around first outer surface 78 of turbine cartridge 52, cooling turbine cartridge 52 and bearing 54. After flowing around first outer surface 78 of turbine cartridge 52, the oil may drain into cavity 80 of bearing housing 38. Baffles 162 may help minimize oil migration to labyrinth seal 176 by oil wicking around baffles 162 and flowing through annular gaps 188. In one exemplary embodiment, flow of liquid oil across baffles 162 may be eliminated leaving only vestigial oil vapor to pass through baffles 162.

During engine operation, exhaust gases may flow across turbine wheel 32, rotating turbine wheel 32 and shaft 18. Because engine exhaust is hot, flow of exhaust through turbine housing 30 may heat turbine housing 30 and turbine housing wall 114 to a temperature which may be significantly higher than an ambient temperature. Annular gap 112 between turbine housing wall 114 and turbine cartridge 52 and seal collar 56 may help minimize the transfer of heat from turbine housing wall 114 to turbine cartridge 52 and seal collar 56. Further, annular cavity 116 may also help minimize transfer of heat from turbine housing wall 114 to turbine cartridge 52 and seal collar 56. Additionally, the flow of oil via channel 76 around first outer surface 78 of turbine cartridge 52 may help cool turbine cartridge 52 and bearing 54. Minimizing heat transfer to turbine cartridge 52 and bearing 54 and cooling these components using oil from channel 76 may help increase the useful life of turbine cartridge 52 and bearing 54.

Further, during engine operation, exhaust gases flowing through turbine housing 30 may enter and pressurize annular cavity 214. Compressed air from compressor housing 20 may also enter annular cavity 116 and charge labyrinth seal 176 and step seal 178. Pressure of the compressed air in annular cavity 116, labyrinth seal 176 and step seal 178 may counteract the pressure of the exhaust gases in annular cavity 214. Pressurized air in annular cavity 116 may help prevent or minimize leakage of exhaust gases from turbine housing 30 into bearing housing 38. Charging labyrinth seal 176 and step seal 178 with compressed air may also make it difficult for the exhaust gases in turbine housing 30 to pass through labyrinth seal 176 and step seal 178 and reach bearing 54. Additionally, projections 184 and annular gap 186 in labyrinth seal 176 and projections 194 and step seal cavities 200 in step seal 178 may impose a significant pressure gradient, which may prevent exhaust gases from turbine housing 30 from reaching bearing 54. Reducing the flow of exhaust gases into bearing housing 38 may also help minimize leakage of exhaust gases into the engine crankcase, which in turn may help minimize the soot content in the crankcase ventilation. Pressurizing labyrinth seal 176 and step seal 178 may also help counteract any flow of oil, which may wick around baffles 162 and flow through annular gaps 188. In one exemplary embodiment, the pressurized labyrinth seal 176 and step seal 178 may prevent any liquid flow of oil from escaping baffles 162, allowing only vestigial amounts of oil vapor to reach labyrinth seal 176. Pressurizing labyrinth seal 176 and step seal 178 with compressed air form compressor housing 20 may further help prevent migration of the oil vapor through labyrinth seal 176 and step seal 178.

Additionally, during engine operation, imbalance in turbine wheel 32 and/or compressor impeller 16 may cause baffles 162 to contact outer surface 190 of seal collar 56. Similarly, the imbalance may cause projections 184, 194 to contact inner surface 130 or inner surfaces of one or more annular bores 140, 142, 144, 146, 148, 150, 152, 154. The disclosed turbine bearing and seal assembly may make it easier and cost effective to remove and replace turbine cartridge 52 and/or seal collar 56 without the need for expensive repairs to bearing housing 38 or turbine housing 30.

It will be apparent to those skilled in the art that various modifications and variations can be made to the disclosed turbine bearing and seal assembly. Other embodiments will be apparent to those skilled in the art from consideration of the specification and practice of the disclosed turbine bearing and seal assembly. It is intended that the specification and examples be considered as exemplary only, with a true scope being indicated by the following claims and their equivalents.

What is claimed is:

1. A turbine bearing and seal assembly, comprising:
   a turbine cartridge having a compressor end and a turbine end opposite the compressor end;
   a bearing aligned with the turbine cartridge, the bearing being disposed between the compressor end and the turbine end; and
   a seal collar attachable to a shaft, the seal collar being disposed within the turbine cartridge, the seal collar extending from a front end disposed adjacent the turbine end to a rear end disposed between the turbine end and the compressor end, the seal collar including:
      a step seal disposed adjacent the front end, the step seal having a conical outer surface; and
      a labyrinth seal disposed adjacent the rear end.

2. The turbine bearing and seal assembly of claim 1, wherein the turbine cartridge includes a mounting flange disposed between the compressor end and the turbine end, the mounting flange being configured to engage with a bearing housing.

3. The turbine bearing and seal assembly of claim 1, wherein the step seal and the labyrinth seal are configured to be charged with compressed air received from a compressor housing associated with the turbine bearing and seal assembly.

4. The turbine bearing and seal assembly of claim 3, wherein the labyrinth seal includes:
   a cylindrical outer surface; and
   projections extending radially outward from the outer surface, the projections being axially spaced apart from each other.

5. The turbine bearing and seal assembly of claim 4, wherein an inner surface of the third cartridge bore of the turbine cartridge is separated from the projections by an annular gap.

6. The turbine bearing and seal assembly of claim 3, wherein the step seal includes:
   projections extending radially outward from the outer surface, the projections being axially spaced apart from each other.

7. The turbine bearing and seal assembly of claim 6, wherein
   inner surfaces of the first annular bore and the second annular bore are separated from the projections by corresponding annular gaps; and
   the projections cooperate with the inner surfaces to form cavities.

8. The turbine bearing and seal assembly of claim 7, wherein each of the cavities includes:
   an upper cavity;
   a lower cavity axially offset from the upper cavity;
   an inlet located at a first cavity end, the inlet being located an inlet radius;
   an outlet located at a second cavity end opposite the first cavity end, the outlet being located at an outlet radius larger than the inlet radius.

9. The turbine bearing and seal assembly of claim 1, wherein the turbine cartridge includes:
   a first cartridge bore adjacent the compressor end, the first cartridge bore having a conical inner surface extending from the compressor end to a first distal end within the turbine cartridge; and
   a second cartridge bore adjacent the turbine end, the second cartridge bore having a conical shape extending from the turbine end to a second distal end within the turbine cartridge, the second cartridge bore being configured to receive the seal collar.

10. The turbine bearing and seal assembly of claim 9, wherein the turbine cartridge includes a third cartridge bore disposed between the first cartridge bore and the second cartridge bore, the third cartridge bore having a cylindrical shape and being configured to receive the bearing.

11. The turbine bearing and seal assembly of claim 10, wherein the third cartridge bore includes:
    an annular recess; and
    a plurality of baffles extending radially inward from an inner surface of the annular recess.

12. The turbine bearing and seal assembly of claim 10, wherein the second cartridge bore includes:
    at least a first annular bore disposed at a first axial distance from the second distal end, the first annular bore having a first radius; and
    at least a second annular bore disposed at a second axial distance from the second distal end, the second axial distance being larger than the first axial distance, the second annular bore having a second radius larger than the first radius.

13. A turbocharger, comprising:
    a turbine housing;
    a turbine wheel disposed within the turbine housing and configured to be rotated by exhaust received from an engine;
    a compressor housing;
    a shaft attached to the turbine wheel, the shaft extending from the turbine housing to the compressor housing;
    a compressor impeller disposed within the compressor housing, the compressor impeller being disposed on the shaft and configured to be driven by the turbine wheel;
    a bearing housing disposed coaxially with the shaft;
    a turbine cartridge disposed within the bearing housing, the turbine cartridge including:
       a compressor end;
       a turbine end opposite the compressor end;
       a first cartridge bore extending from the compressor end to a first distal end within the turbine cartridge, the first cartridge bore having a conical inner surface;
       a second cartridge bore extending from the turbine end to a second distal end within the turbine cartridge, the second cartridge bore having a conical shape; and
       a third cartridge bore disposed between the first cartridge bore and the second cartridge bore, the third cartridge bore having a cylindrical shape;
    a bearing disposed within the third cartridge bore of the turbine cartridge, the bearing being configured to support the shaft; and
    a seal collar attached to the shaft, the seal collar being disposed within the turbine cartridge, the seal collar extending from a front end disposed adjacent the turbine end to a rear end disposed between the turbine end and the compressor end, the seal collar including:

a step seal disposed adjacent the front end, the step seal having a conical outer surface; and a labyrinth seal disposed adjacent the rear end.

14. The turbocharger of claim 13, wherein the step seal and the labyrinth seal are configured to be charged with compressed air from the compressor housing.

* * * * *